United States Patent
Kim et al.

(10) Patent No.: US 12,438,234 B2
(45) Date of Patent: Oct. 7, 2025

(54) SEPARATOR, METHOD OF MANUFACTURING SEPARATOR, AND ELECTROCHEMICAL DEVICE INCLUDING SEPARATOR

(71) Applicants: SK INNOVATION CO., LTD., Seoul (KR); SK IE TECHNOLOGY CO., LTD., Seoul (KR)

(72) Inventors: Yun Bong Kim, Daejeon (KR); Kyu Young Cho, Daejeon (KR); Tae Wook Kwon, Daejeon (KR); Heung Taek Bae, Daejeon (KR)

(73) Assignees: SK INNOVATION CO., LTD., Seoul (KR); SK IE TECHNOLOGY CO., LTD., Seoul (KR)

( * ) Notice: Subject to any disclaimer, the term of this patent is extended or adjusted under 35 U.S.C. 154(b) by 0 days.

(21) Appl. No.: 18/663,073

(22) Filed: May 14, 2024

(65) Prior Publication Data
US 2024/0297407 A1    Sep. 5, 2024

Related U.S. Application Data

(62) Division of application No. 18/331,272, filed on Jun. 8, 2023, now Pat. No. 12,015,170.

(30) Foreign Application Priority Data

Jun. 9, 2022    (KR) .......................... 10-2022-0070383

(51) Int. Cl.
| | | |
|---|---|---|
| *H01M 50/431* | (2021.01) | |
| *H01M 10/052* | (2010.01) | |
| *H01M 50/403* | (2021.01) | |
| *H01M 50/449* | (2021.01) | |

(52) U.S. Cl.
CPC ....... *H01M 50/431* (2021.01); *H01M 10/052* (2013.01); *H01M 50/403* (2021.01); *H01M 50/449* (2021.01)

(58) Field of Classification Search
CPC ............. H01M 50/431; H01M 50/403; H01M 50/449; H01M 10/052
See application file for complete search history.

(56) References Cited

FOREIGN PATENT DOCUMENTS

WO    WO-2016201757 A1 * 12/2016 .......... H01M 50/403

* cited by examiner

*Primary Examiner* — Karie O'Neill Apicella
(74) *Attorney, Agent, or Firm* — IP & T GROUP LLP

(57) ABSTRACT

A separator, a method of manufacturing the separator, and an electrochemical device including the separator. The separator includes: a porous substrate; and an inorganic particle layer formed on at least one surface of the porous substrate, wherein a release rate of the inorganic particle layer is 70% or more when measured by immersing the separator in a water tank at room temperature and then subjecting the separator to sonication under conditions of a frequency of 40 kHz, an output of 1,000 W, and an application time of 60 seconds.

9 Claims, No Drawings

SEPARATOR, METHOD OF MANUFACTURING SEPARATOR, AND ELECTROCHEMICAL DEVICE INCLUDING SEPARATOR

CROSS-REFERENCE TO RELATED APPLICATIONS

This application is a division of U.S. patent application Ser. No. 18/331,272 filed on Jun. 8, 2023, which claims priority under 35 U.S.C. § 119 to Korean Patent Application No. 10-2022-0070383, filed on Jun. 9, 2022, in the Korean Intellectual Property Office, the disclosure of which is incorporated herein by reference in its entirety.

TECHNICAL FIELD

The following disclosure relates to a separator, a method of manufacturing the separator, and an electrochemical device including the separator.

BACKGROUND

In order to improve thermal stability of a separator, an organic-inorganic composite porous separator has been considered. Such an organic-inorganic composite porous separator may be provided with a porous inorganic particle layer formed by coating a slurry composition of inorganic particles and a binder polymer on a polyolefin porous substrate so that the inorganic particles are connected to each other on one surface or both surfaces of the porous substrate to form pores between the inorganic particles.

Recently, an interest in eco-friendly technology has rapidly increased, and a recycling technology using waste products has been developed in various industrial fields. In the case of the organic-inorganic composite porous separator, when the organic-inorganic composite porous separator is chipped and/or pelletized in recycling, it is difficult to estimate physical properties of a final recycled product due to the inorganic particle layer provided on the surface of the polyolefin porous substrate, physical properties thereof are deteriorated compared to a polyolefin material, and a high load in an extruder occurs due to high viscosity of a resin mixture.

RELATED ART DOCUMENT

Patent Document (Patent Document 1) Korean Patent Laid-Open Publication No. 10-2014-00011136 (Jan. 28, 2014)

SUMMARY

In recycling of an organic-inorganic composite porous separator, a way to release the inorganic particle layer provided on the surface of the porous substrate is needed, but the currently developed process(es) of releasing the inorganic particle layer is complicated, costly, and time consuming. In particular, when the inorganic particle layer is released in a treatment tank filled with an organic solvent and the like, the organic solvent may remain and adversely affect the physical properties of the recycled product later, and may also cause concerns such as damage to the human body and environmental pollution.

One embodiment of the present invention is directed to providing a separator that has significantly improved thermal stability and is relatively easy to recycle because an inorganic particle layer is released by a relatively simple process, a method of manufacturing the separator, and an electrochemical device including the separator.

In one embodiment, a separator includes: a porous substrate; and an inorganic particle layer formed on at least one surface of the porous substrate, wherein a release rate of the inorganic particle layer represented by the following Formula (1) is 70% or more when measured by immersing the separator in a water tank at room temperature and then subjecting the separator to sonication under conditions of a frequency of 40 kHz, an output of 1,000 W, and an application time of 60 seconds:

$$(w_i - w_f)/w_c * 100 \qquad (1)$$

wherein
$w_i$ is a weight of the separator before the sonication,
$w_f$ is a weight of the separator after the sonication, and
$w_c$ is a weight of the inorganic particle layer before the sonication.

In addition, in another embodiment, the release rate of the inorganic particle layer may be 80% or more, up to 90% or more, up to 100%.

In addition, in one embodiment, the inorganic particle layer may have a (D80−D20)/D50 value of 0.01 to 2.0 in a particle size distribution of inorganic particles.

In addition, in another embodiment, when specimens each having a thickness of 5 to 50 μm, a width of 5 mm, and a length of 10 mm in each of a machine direction (MD) and a transverse direction (TD) serving as length directions are prepared from the separator, and the specimen is mounted on a chamber of a thermomechanical analyzer (TMA) by hooking both ends of the specimen to a metal jig and pulled downward with a force of 0.008 N while heating at 5° C. per minute, the specimen may have heat resistance in which the specimen is broken at a temperature of 180° C. or higher in both MD and TD.

In addition, in one embodiment, a heat shrinkage rate in each of MD and TD may be 3% or less when measured after the separator is allowed to stand at 150° C. for 60 minutes.

In addition, in another embodiment, the inorganic particle layer may include inorganic particles and a hydrolytic condensate of a silane compound.

In addition, in one embodiment, the hydrolytic condensate of the silane compound may be a hydrolytic condensate produced under a condition in which the silane compound is hydrolyzed and is condensation-suppressed in a weakly acidic atmosphere.

In addition, in another embodiment, a number average molecular weight of the hydrolytic condensate of the silane compound may be 4,000 g/mol or less.

In addition, in one embodiment, the silane compound may be a compound represented by the following Chemical Formula 1:

$A_aSi(OR)_b$            Chemical Formula 1 wherein A is hydrogen, a polar functional group, or a C1-C10 alkyl group having a polar functional group, R is independent of hydrogen or a C1-C5 alkyl group, a is 0 to 2, b is 2 to 4, and a+b is 4.

In addition, in one embodiment, the polar functional group may include one or two or more of an amino group, an epoxy group, a carboxyl group, a hydroxyl group, an amide group, a thiol group, a ketone group, an ester group, and an aldehyde group.

In addition, in another embodiment, the porous substrate may have a surface including a polar functional group.

In another general aspect, a method of manufacturing a separator includes: (a) stirring a silane compound represented by the following Chemical Formula 1, inorganic particles, an acid component, and water to prepare a coating slurry; and (b) applying the prepared coating slurry on at least one surface of a porous substrate and drying the coating slurry to provide an inorganic particle layer:

$$A_aSi(OR)_b \qquad \text{Chemical Formula 1}$$

wherein A is hydrogen, a polar functional group, or a C1-C10 alkyl group having a polar functional group, R is independent of hydrogen or a C1-C5 alkyl group, a is 0 to 2, b is 2 to 4, and a+b is 4.

In addition, in another embodiment, the coating slurry in the process (a) may be prepared by:
 (a1) preparing an acid aqueous solution including a silane compound represented by Chemical Formula 1 and an acid component;
 (a2) preparing an inorganic slurry by stirring inorganic particles, an acid component, and water; and
 (a3) preparing a coating slurry by stirring the prepared inorganic slurry and acid aqueous solution.

In addition, in one embodiment, the process (a3) may be performed in a weakly acidic atmosphere of more than pH 4 and pH 7 or less.

In addition, in another embodiment, an absolute value of a difference in pH of the inorganic slurry prepared in the process (a2) and pH of the acid aqueous solution prepared in the process (a1) may be 1 or less.

In addition, in another embodiment, in the process (a2), the inorganic slurry may be prepared by stirring the inorganic particles, acid component, and water at 50 to 500 rpm for 1 hour or longer, for example, 2 hours, 5 hours, 10 hours or more, and preferably 1 to 5 hours.

In addition, in one embodiment, the process (a) may be performed in a weakly acidic atmosphere of more than pH 4 and pH 7 or less.

In addition, in another embodiment, the polar functional group of the silane compound may include one or two or more selected from an amino group, an epoxy group, a carboxyl group, a hydroxyl group, an amide group, a thiol group, a ketone group, an ester group, and an aldehyde group.

In addition, in one embodiment, the acid component may be carbon dioxide, or an organic acid including one or two selected from acetic acid and lactic acid.

In addition, in another embodiment, a weight ratio of the silane compound of Chemical Formula 1 to the inorganic particles in the coating slurry may be 0.1 to 30:99.9 to 70.

In addition, in one embodiment, the method of manufacturing a separator may further include, after the process (b), (c) aging the porous substrate on which the inorganic particle layer is provided.

In addition, in another embodiment, a surface of the porous substrate may be subjected to a hydrophilic surface treatment.

In addition, in one embodiment, the hydrophilic surface treatment may include one or more of a corona discharge treatment and a plasma discharge treatment.

In still another general aspect, an electrochemical device includes the separator according to the embodiments described above.

Other features and aspects will be apparent from the following detailed description, and the claims.

DETAILED DESCRIPTION OF EMBODIMENTS

Hereinafter, the present disclosure will be described in more detail with reference to specific embodiments. However, each of the following embodiments is merely one example, and the present disclosure is not limited thereto and may be implemented in various forms.

In addition, unless otherwise defined, all the technical terms and scientific terms have their plain and ordinary meanings as commonly understood by those skilled in the art to which the present disclosure pertains. The terms used in the description of the present disclosure are merely used to describe a specific embodiment, but are not intended to limit the present disclosure.

In addition, unless the context clearly indicates otherwise, singular forms used in the specification and the appended claims include plural forms.

In addition, unless explicitly described to the contrary, the term "comprising" includes other components rather than the exclusion of any other components.

In the present specification, "D50" refers to a particle diameter of inorganic particles which corresponds to 50% of a volume-based integration fraction. "D80" refers to a particle diameter of inorganic particles which corresponds to 80% of a volume-based integration fraction. "D20" refers to a particle diameter of inorganic particles which corresponds to 20% of a volume-based integration fraction. D50, D80, and D20 may be derived from particle size distribution results obtained by collecting a sample of the inorganic particles to be measured in accordance with the standard of KS A ISO 13320-1 and performing analysis using a Multisizer 4e Coulter counter available from Beckman Coulter Inc.

In the present specification, "room temperature" may refer to a temperature of 20±5° C. According to one embodiment of the present disclosure, a separator may include: a porous substrate; and an inorganic particle layer provided on at least one surface of the porous substrate, wherein a release rate value of the inorganic particle layer represented by the following Formula (1) is 70% or more when measured by immersing the separator in a water tank at room temperature and then subjecting the separator to sonication under conditions of a frequency of 40 kHz, an output of 1,000 W, and an application time of 60 seconds:

$$(w_i - w_f)/w_c * 100 \qquad (1)$$

wherein
 $w_i$ is a weight of the separator before the sonication, and is determined by measuring a weight of the separator that is not subjected to the sonication, and
 $w_f$ is a weight of the separator after the sonication, and is determined by measuring a weight of the separator that is subjected to the sonication.
 $w_c$ is a weight of the inorganic particle layer before the sonication, and is determined by subtracting the weight of the porous substrate from the weight $w_i$ of the separator before the sonication. When the weight per unit area of the porous substrate is known, the weight of the porous substrate is obtained by multiplying an area of 100 cm² of the specimen by the weight per unit area of the porous substrate, and when the weight per unit area of the porous substrate is not known, the separator before the sonication is cut into a square with a side of 10 cm, the cut separator is immersed in a water tank at a high temperature of 80° C. or higher and then subjected to sonication and scrubbing at the same time for 5 minutes or longer to wash the separator to a level at which the water in the water tank does not become turbid, the washed separator is immersed in a treatment tank filled with an organic solvent such as acetone for 30 minutes or longer to wash the separator so as to release the inorganic particle layer, the porous substrate is sufficiently dried in an oven at 80° C. for 1 hour or longer, and then the weight of the dried porous substrate is measured.

In one embodiment, the sonication may be performed using an ultrasonic tool (sonication horn) available from Korea Ultrasound Industry.

Specifically, the release rate value of the inorganic particle layer is influenced in a complex way by a thickness of the inorganic particle layer, a particle diameter of the inorganic particle, a porosity and thickness of the porous substrate, a type, molecular weight, and ratio of a binder used in the inorganic particle layer, and the like. In particular, when the inorganic particle layer is ultra-finely processed by vibration and rotation of water molecules by sonication, a degree of release of the inorganic particle layer in the water tank is influenced by the type and molecular weight of the binder that connects and fixes the inorganic particle layer.

In the case of a water-soluble polymer binder such as polyvinyl alcohol, which is commonly used as a binder for the inorganic particle layer in the related art, solubility in water is relatively high, but in order to release the inorganic particle layer, a complicated process such as a scrubbing process or another release process is required because a molecular weight is high or a fraction of a polar group is small, and thus costs and time are wasted. That is, when the inorganic particle layer is subjected to sonication by adopting the water-soluble polymer binder according to the related art, it is expected that the release rate value is low because the inorganic particle layer is not released simply.

According to one embodiment of the present invention, it is possible to provide, as a binder, a hydrolytic condensate of a silane compound that has a low molecular weight and a relatively high fraction of a polar group because a condensation reaction is suppressed compared to a hydrolysis reaction through a specific pH range and a precise pH control process. As a result, it is possible with the present disclosure to impart significantly improved high heat resistance and an improved recycling effect at the same time.

As a specific embodiment, the release rate value of the inorganic particle layer may be 70% or more, 80% or more, 90% or more, 95% or more, 100% or less, or any value between these numerical values. As a more specific embodiment, the release rate value of the inorganic particle layer may be 70 to 100%, 80 to 100%, and 90 to 100% or 95 to 100%.

As another embodiment, it is possible to provide with the present disclosure a separator having heat resistance so that when specimens each having a thickness of 5 to 50 μm, a width of 5 mm, and a length of 10 mm in each of a machine direction (MD) and a transverse direction (TD) serving as length directions are prepared from the separator, and the specimen is mounted on a chamber of a thermomechanical analyzer (TMA) (model: SDTA840 (Mettler Toledo)) by hooking both ends of each specimen to a metal jig and pulled downward with a force of 0.008 N while heating at 5° C. per minute, the specimens are broken at a temperature of 180° C. or higher, 190° C. or higher, 200° C. or higher, or 210° C. or higher.

In another embodiment, a heat shrinkage rate in each of MD and TD may be 3% or less, 2.5% or less, or 2% or less, when measured after the separator is allowed to stand at 150° C. for 60 minutes.

In one embodiment, a method of providing the physical properties described above is not particularly limited. However, the method of imparting the above physical properties may be achieved, for example, by manufacturing a separator including an inorganic particle layer in which pores are formed by connecting inorganic particles to each other by condensing a silane compound represented by the following Chemical Formula 1 under a condition in which the silane compound is hydrolyzed and is condensation-suppressed, and applying a slurry obtained by mixing the hydrolytic condensate of the silane compound with inorganic particles on at least one surface of a porous substrate formed of polyethylene or the like.

  Chemical Formula 1

In Chemical Formula 1, A is hydrogen, a polar functional group, or a C1-C10 alkyl group having a polar functional group, R is independent of hydrogen or a C1-C5 alkyl group, a is 0 to 2, b is 2 to 4, and a+b is 4. The polar functional group may include one or two or more of an amino group, an epoxy group, a carboxyl group, a hydroxyl group, an amide group, a thiol group, a ketone group, an ester group, and an aldehyde group.

As another embodiment, examples of the method of providing a separator having the above physical properties include: stirring an acid aqueous solution (whose pH is adjusted in advance) and an inorganic slurry to prepare a coating slurry; and coating and drying, on at least one surface of the porous substrate, the coating slurry maintained and controlled so that the silane compound of Chemical Formula 1 is stably condensed under a condition in which the silane compound is hydrolyzed and is condensation-suppressed. Accordingly, a separator satisfying the above physical properties may be manufactured.

Hereinafter, each component of the separator according to various embodiments of the present invention will be described.

According to one embodiment, a polyolefin-based porous substrate including polyethylene, polypropylene, or a copolymer thereof as a main component may be used as the porous substrate, and the porous substrate may be a film or sheet formed of one or two or more resins selected from the group consisting of polyethylene, polypropylene, and a copolymer thereof.

A thickness of the porous substrate is not particularly limited, and in one embodiment may be, for example, 1 μm or more, 3 μm or more, 5 μm or more, 100 μm or less, 50 μm or less, 30 μm or less, 20 μm or less, or any value between these numerical values. As a non-limiting example, the thickness of the porous substrate may be 1 to 100 μm, 5 to 50 μm, and 5 to 30 μm. According to an example, the porous substrate may be a porous polymer substrate produced by stretching.

In one embodiment, the porous substrate may have a surface including a polar functional group. Non-limiting examples of the polar functional group include a carboxyl group, an aldehyde group, and a hydroxyl group. In various embodiments, the polar functional group may be introduced by a hydrophilic surface treatment, and the hydrophilic surface treatment may include one or more of a corona discharge treatment and a plasma discharge treatment. The polar functional group provided on the surface of the porous substrate is useful because it may further improve an adhesive strength between the porous substrate and the inorganic particle layer by hydrogen bonding or chemical bonding to a polar functional group of a hydrolytic condensate of a silane compound described below, and may improve thermal stability by further reducing the heat shrinkage rate at a high temperature.

In another embodiment, the inorganic particle layer may include inorganic particles and a hydrolytic condensate of a silane compound, and may be a porous inorganic particle layer in which pores are formed by connecting and fixing inorganic particles together by the hydrolytic condensate of the silane compound. In one embodiment, the inorganic particle layer may be provided on at least one surface of the porous substrate, and may have an area fraction of 60% or more, 70% or more, 80% or more, or 90% or more based on an overall surface of the porous substrate, or the inorganic particle layer may be provided on the entire surface of the porous substrate.

In another embodiment, the inorganic particle layer may be coated on one surface, and both surfaces of the porous substrate. When the inorganic particle layer is coated on both surfaces of the porous substrate, a thickness of the inorganic particle layer coated on one surface and a thickness of the inorganic particle layer coated on the other surface may be the same as or different from each other. Although not particularly limited, in one embodiment, the thickness of the inorganic particle layer coated on one surface may be more than 0 μm, 0.3 μm or more, 0.5 μm or more, 3 μm or less, 2.5 μm or less, 2 μm or less, 1.5 μm or less, 1 μm or less, or any value between these numerical values. In a specific embodiment, the thickness of the inorganic particle layer may be more than 0 μm and 2.5 μm or less or more than 0 μm and 2 μm or less, more than 0 μm and 1.5 μm or less, and more than 0 μm and 1 μm or less.

In another embodiment, the inorganic particles are not limited. As a non-limiting example, the inorganic particles may include one or two or more of a metal hydroxide, a metal oxide, a metal nitride, and a metal carbide, and more specifically, may include one or two or more of $SiO_2$, SiC, MgO, $Y_2O_3$, $Al_2O_3$, $CeO_2$, Cao, Zno, $SrTiO_3$, $ZrO_2$, $TiO_2$, and AlO(OH). From the viewpoint of battery stability and the like, the inorganic particles may be metal hydroxide particles such as boehmite.

The metal hydroxide is not particularly limited, and as a non-limiting example, the metal hydroxide may include one or two or more of boehmite, aluminum hydroxide, and magnesium hydroxide.

In another embodiment, when the boehmite is used, a specific surface area (BET) of the inorganic particles may be 10 $m^2/g$ or more or 15 $m^2/g$ or more, up to 50 $m^2/g$, or the values between the numericals, but is not limited thereto.

In one embodiment, when inorganic particles having a specific particle size distribution and a hydrolytic condensate of a silane compound produced under a condition in which condensation of the silane compound is suppressed as described below are applied together to the inorganic particle layer, the inorganic particle layer is (uniformly) filled with the inorganic particles by the hydrolytic condensate of the silane compound, such that the release rate of the inorganic particle layer may be significantly improved during subsequent sonication. In one embodiment, in the particle size distribution of the inorganic particles, a (D80–D20)/D50 value may be 0.01 or more, 0.03 or more, 0.05 or more, 0.1 or more, 0.2 or more, 2.0 or less, 1.8 or less, 1.5 or less, 1.3 or less, 1.2 or less, or any value between these numerical values. As a non-limiting example, the (D80–D20)/D50 value may be 0.01 to 2.0, 0.01 to 1.8, and 0.01 to 1.5. When the inorganic particles satisfy the particle size distribution within the above range (s), the inorganic particles are (evenly) connected and fixed to the hydrolytic condensate of the silane compound produced under a condition in which condensation of the silane compound is suppressed, and the inorganic particle layer is filled (e.g., uniformly filled) with the inorganic particles, such that the release rate of the inorganic particle layer is further improved during the sonication.

A D50 value of the inorganic particles is not particularly limited as long as the above particle size distribution is satisfied, and as a non-limiting example, the D50 value of the inorganic particles may be more than 0 μm, 0.1 μm or more, 5 μm or less, 3 μm or less, 1 μm or less, or between the numerical values. As a specific embodiment, the D50 value of the inorganic particles may be 0.1 to 5 μm, 0.1 to 3 μm, and 0.1 to 1 μm.

Next, in another embodiment, a binder that connects and fixes the inorganic particles to form the inorganic particle layer in which pores are formed will be described. In this embodiment, the binder may be a low molecular weight hydrolytic condensate obtained by hydrolyzing and condensing a silane compound represented by the following Chemical Formula 1 and having a significantly suppressed molecular weight.

  Chemical Formula 1

In Chemical Formula 1, A is hydrogen, a polar functional group, or a C1-C10 alkyl group having a polar functional group, R is independent of hydrogen or a C1-C5 alkyl group, a is 0 to 2, b is 2 to 4, and a+b is 4. In another embodiment, a low molecular weight condensate may be used obtained by condensation using the silane compound of Chemical Formula 1 in which b is 3 in terms of adhesive strength and the like.

The polar functional group of the silane compound may include one or two or more selected from an amino group, an epoxy group, a carboxyl group, a hydroxyl group, an amide group, a thiol group, a ketone group, an ester group, and an aldehyde group, or may be a reactive group that reacts with these groups. According to another embodiment of the present disclosure, the polar functional group may be an amino group.

As a non-limiting example, the silane compound satisfying Chemical Formula 1 may be one or a mixture of two or more selected from (3-aminopropyl) triethoxysilane, (3-aminopropyl) trimethoxysilane, and (3-glycidyloxypropyl) trimethoxysilane, but is not limited thereto.

In one embodiment, the hydrolytic condensate of the silane compound has a low molecular weight because it is prepared under a condition in which the silane compound is hydrolyzed and is condensation-suppressed. In one embodiment, the hydrolytic condensate of the silane compound may be a hydrolytic condensate produced under a condition in which the silane compound is hydrolyzed and is condensation-suppressed in a weakly acidic atmosphere, and may be prepared with a significantly low molecular weight because a condensation reaction is suppressed in a weakly acidic atmosphere. In another embodiment, the hydrolytic condensate of the silane compound may be a low molecular weight hydrolytic condensate having a number average molecular weight of, for example, 4,000 g/mol or less, 2,000 g/mol or less, or 1,000 g/mol or less.

Meanwhile, in general, when the silane compound of Chemical Formula 1 is condensed with a strong acid such as an inorganic acid, a polysiloxane condensate having a number average molecular weight of more than 4,000 g/mol is produced. On the other hand, the hydrolytic condensate of the silane compound according to one embodiment of the present disclosure produced under the condition in which condensation of the silane compound is suppressed differs from the general case in that the condensate is a hydrolytic condensate including a hydrolysate itself, an unreacted product in a form of a monomer, and a dimer hydrolytic condensate as main components, and a trace amount of a trimer hydrolytic condensate or a tetramer hydrolytic condensate.

That is, in one embodiment, the hydrolytic condensate of the silane compound may include one or two or more selected from a hydrolysate, a monomer, and a multimer, such as a hydrolyzed and condensed dimer, trimer, tetramer, or pentamer, of the silane compound.

The low molecular weight hydrolytic condensate of the silane compound as described above was confirmed from a detection peak detected in positive electrospray ionization-mass spectrometry (ESI-MS) analysis using Positive electrospray ionization Fourier transform ion cyclotron resonance mass spectrometer (posESI FT-ICRMS) (manufacturer: Bruker Corporation, model name: Solarix 2XR). That is, as a result of the positive ESI-MS analysis, peaks of silanol, which is a hydrolysate, and a dimer, which is a condensate, are mainly observed, and peaks of trace amounts of a trimer and a tetramer are observed, and peaks of a pentamer or higher multimer are hardly detected within one day or two days, which is a period for preparing a general slurry. However, in a case where a silane compound is hydrolyzed and condensed using hydrochloric acid, which is an inorganic acid, for 24 hours, complex peaks of high molecular weight hydrolytic condensates are observed. That is, from these results, it was confirmed that the hydrolytic condensate of the silane compound prepared in a weakly acidic atmosphere of the various embodiments and a material different from the hydrolytic condensate prepared with a general inorganic acid or the like are obtained.

The hydrolytic condensate of the silane compound according to one embodiment is obtained under a condition in which a condensation reaction is suppressed compared to a hydrolysis reaction through a specific pH range and a precise pH control process, and as a result, it is possible to secure a large fraction of the polar functional group at the same weight compared to a high molecular weight polysiloxane condensate generally prepared by condensation with an inorganic acid or the like. Therefore, significantly improved high heat resistance and a simple recycling effect may be simultaneously imparted to the separator.

Next, another embodiment of a method of manufacturing the separator will be described.

The method of imparting the physical properties is not limited, and in one embodiment, it is possible to provide a method of manufacturing a separator, the method including: (a) stirring a silane compound represented by the following Chemical Formula 1, inorganic particles, an acid component, and water to prepare a coating slurry; and (b) applying the prepared coating slurry on at least one surface of a porous substrate and drying the coating slurry to provide an inorganic particle layer.

 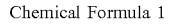

$A_aSi(OR)_b$                         Chemical Formula 1

In Chemical Formula 1, A is hydrogen, a polar functional group, or a C1-C10 alkyl group having a polar functional group, R is independent of hydrogen or a C1-C5 alkyl group, a is 0 to 2, b is 2 to 4, and a+b is 4.

The polar functional group may include one or two or more of an amino group, an epoxy group, a carboxyl group, a hydroxyl group, an amide group, a thiol group, a ketone group, an ester group, and an aldehyde group, or may be a reactive group that reacts with these groups.

Hereinafter, each process of the method of manufacturing a separator according to various embodiments will be described. Descriptions of the silane compound, the inorganic particles, and the porous substrate are the same as those described above, and thus are omitted for convenience.

According to one embodiment, as a method of suppressing a condensation reaction compared to a hydrolysis reaction, the process (a) may be performed in a weakly acidic atmosphere of more than pH 4 and pH 7 or less.

In the process (a) of preparing the coating slurry, although a method or order of adding the components constituting the coating slurry is not particularly limited, since inorganic particles such as boehmite become basic when stirred with water, it is useful to perform a more precise pH control process in order to obtain a hydrolytic condensate of a silane compound of one embodiment of the present disclosure. In one embodiment, the coating slurry in the process (a) may be prepared by:

(a1) preparing an acid aqueous solution including a silane compound represented by Chemical Formula 1 and an acid component;

(a2) preparing an inorganic slurry by stirring inorganic particles, an acid component, and water; and (a3) preparing a coating slurry by stirring the prepared inorganic slurry and acid aqueous solution.

An acid aqueous solution including an acid component and a silane compound represented by Chemical Formula 1 and an inorganic slurry including an acid component are prepared in the process (a1) and the process (a2), respectively, and the pH is adjusted in advance, such that the following effects may be expected. Since the inorganic particles become basic when stirred with water, when the silane compound, the inorganic particles, and since the acid component are simultaneously stirred, the pH may vary during hydrolysis and condensation of the silane compound in the weakly acidic atmosphere. Due to a variation of pH, a desired low molecular weight hydrolytic condensate of a silane compound may not be secured, and aggregation between the inorganic particles may occur. According to one embodiment, since the pH of the inorganic slurry and the pH of the acid aqueous solution including a silane compound are adjusted in advance, in the subsequent process (a3), when the inorganic slurry and the acid aqueous solution are stirred, a variation of pH may be prevented, and a condensation reaction of the silane compound may be suppressed. Therefore, the hydrolytic condensate of the silane compound having a low molecular weight and a relatively high fraction of a polar group may be provided as a binder for the inorganic particle layer, such that significantly improved high heat resistance may be secured and a simple recycling effect (as describe above) may be imparted.

In one embodiment, an absolute value of a difference in pH of the inorganic slurry prepared in the process (a2) and pH of the acid aqueous solution prepared in the process (a1) may be 1 or less. From the point of view described above, in one embodiment, the absolute value of the difference in pH may be 0.7 or less, 0.6 or less, 0.5 or less, 0.4 or less, 0.3 or less, 0.2 or less, or 0.1 or less, and in one embodiment, the absolute value of the difference in pH may be 0.

In another embodiment, the process (a1) of preparing the acid aqueous solution may be performed in a weakly acidic atmosphere of more than pH 4 and pH 7 or less. When a hydrolysis-condensation reaction is performed in a case of pH 4 or less, in a case of a basic atmosphere (more than pH 7), or in a case of using an inorganic acid such as sulfuric acid or hydrochloric acid, a desired low molecular weight hydrolytic condensate of a silane compound may not be secured, which may cause reductions in the heat resistance and difficult recyclability of the separator. In one embodiment, the weakly acidic atmosphere may be more than pH 4, pH 4.5 or more, pH 7 or less, pH 6.5 or less, pH 6 or less, pH 5.5 or less, pH 5 or less, or any value between these numerical values. In a specific embodiment, the weakly acidic atmosphere may be more than pH 4 and pH 7 or less or pH 4.5 or more and pH 7 or less, and the weakly acidic atmosphere may be pH 4.5 or more and pH 6.5 or less or pH 4.5 or more and pH 5.5 or less.

In another embodiment, in the process (a2) of preparing the inorganic slurry, it is sufficient when the absolute value of the difference in pH of the acid aqueous solution prepared in the process (a1) is 1 or less, but as for the pH in the subsequent process (a3) of preparing the coating slurry, the following pH conditions may be useful in order to satisfy the desired condition in which the silane compound is hydrolyzed and is condensation-suppressed. In one embodiment, the process (a2) of preparing the inorganic slurry may be performed in a weakly acidic atmosphere of more than pH 4 and pH 7 or less. When the pH is 4 or less or exceeds 7 in the process (a2) of preparing the inorganic slurry, in the subsequent process (a3) of preparing the coating slurry, the desired condition in which the silane compound is hydrolyzed and is condensation-suppressed may not be satisfied.

According to another embodiment, when the inorganic particles are added to water in the process (a2), the inorganic particles become basic, which may cause a variation of pH, and fluidity of the slurry is relatively reduced due to a high solid content, and as a result, the pH of the inorganic slurry may be non-uniform even when an acid component is added. In consideration of this, in one embodiment, the inorganic slurry prepared in the process (a2) may have a uniform pH by stirring the inorganic particles, acid component, and water at 50 to 500 rpm or 50 to 300 rpm for 1 hour or longer in the process (a2). According to one embodiment, the inorganic slurry whose pH is uniformly controlled is provided in the process (a3) of preparing the coating slurry, such that the pH conditions for securing the hydrolytic condensate of the silane compound may be better maintained and controlled. That is, in one embodiment, the inorganic slurry prepared in the process (a2) may have a uniform acidity.

In another embodiment, the process (a3) of preparing the coating slurry may be performed in a weakly acidic atmosphere of more than pH 4 and pH 7 or less. When a hydrolysis-condensation reaction is performed in a case of pH 4 or less, in a case of a basic atmosphere (more than pH 7), or in a case of using an inorganic acid such as sulfuric acid or hydrochloric acid, dispersibility of the prepared coating slurry may be reduced, the average particle diameter of the inorganic particles may increase due to aggregation between the inorganic particles, and a desired low molecular weight hydrolytic condensate of the silane compound may not be secured. As a result, the heat resistance or recyclability of the separator may be reduced. In another embodiment, the weakly acidic atmosphere may be more than pH 4, pH 4.5 or more, pH 7 or less, pH 6.5 or less, pH 6 or less, pH 5.5 or less, pH 5 or less, or any value between these numerical values. In a specific embodiment, the weakly acidic atmosphere may be more than pH 4 and pH 7 or less or pH 4.5 or more and pH 7 or less, and the weakly acidic atmosphere may be pH 4.5 or more and pH 6.5 or less or pH 4.5 or more and pH 5.5 or less.

The hydrolytic condensate of the silane compound in the embodiment described above is obtained through a specific pH range and a precise pH control process, and has a low molecular weight because a condensation reaction is suppressed. Accordingly, when a hydrolytic condensate of a silane compound obtained under a condition in which the silane compound is hydrolyzed and is condensation-suppressed in a weakly acidic atmosphere is used as a binder for the inorganic particle layer, it is possible to provide a separator that has significantly improved thermal stability and which can be recycled by a simple sonication process.

In another embodiment, the acid component may be carbon dioxide, or an organic acid including one or two selected from acetic acid and lactic acid. Carbon dioxide may become carbonic acid when added to the inorganic slurry or the acid aqueous solution and then stirred or bubbled. When the acid component is used, the effect of the present invention may be achieved, and the condensation reaction may be suppressed in the above pH range(s), but the present invention is not limited thereto.

In another embodiment, a weight ratio of the silane compound of Chemical Formula 1 to the inorganic particles in the coating slurry may be 0.1 to 30:99.9 to 70, 1 to 20:99 to 80, or 5 to 20:95 to 80, but the present disclosure is not particularly limited.

The acid aqueous solution prepared in the process (a1), the inorganic slurry prepared in the process (a2), and the coating slurry prepared in the process (a3) may further include other components or additives, and compositions thereof are not particularly limited.

According to another embodiment of the present invention, in the process (b), an inorganic particle layer may be provided on at least one surface of the porous substrate. In another embodiment, as a method of applying the coating slurry, various methods may be applied without limitation. The drying to form the inorganic particle layer is not particularly limited, and may be performed at 100° C. or lower or 30 to 60° C.

In one embodiment, the method of manufacturing a separator may further include, after the process (b), (c) aging the porous substrate on which the inorganic particle layer is provided. Specifically, the aging may be performed at 50 to 150° C., and may be performed at 65 to 120° C., and the aging may be performed for 2 hours to 24 hours, and may be performed for 10 to 20 hours. Moreover, the aging may be performed in a temperature range of 70 to 120° C. for 10 to 15 hours. Through the aging, the adhesive strength between the porous substrate and the inorganic particle layer may be increased, and the high-temperature shrinkage characteristics may be improved.

That is, the method of manufacturing a separator according to one embodiment of the present disclosure further includes the aging process, such that high-temperature shrinkage characteristics may be further improved through a stable and strong chemical bonding between the porous substrate and the inorganic particle layer, thereby providing a method of manufacturing a separator having further improved thermal stability. In addition, the adhesive strength between the porous substrate and the inorganic particle layer may be further improved.

In addition, in another embodiment, a secondary battery including the separator may be provided, and non-limiting examples of the secondary battery include a lithium secondary battery. Since the lithium secondary battery is well known and a configuration thereof is also known, the lithium secondary battery is not described in detail in the present invention. In one embodiment, the lithium secondary battery may include the separator between a positive electrode and a negative electrode. In this case, any positive electrode and negative electrode may be used without limitation as long as these electrodes are generally used in a lithium secondary battery.

Hereinafter, the present disclosure will be described in more detail with reference to Examples and Comparative Examples. However, the following Examples and Comparative Examples are only examples for describing the present disclosure in more detail, and the present disclosure is not limited by the following Examples and Comparative Examples.

First, the methods for measuring and evaluating the physical properties of the separator will be described.

Release Rate of Inorganic Particle Layer

After a separator specimen cut into a square with a side of 10 cm was immersed in a water tank at room temperature, a release rate of an inorganic particle layer was determined from results before and after sonication by the following Formula (1).

$$(w_i - w_f)/w_c * 100 \qquad (1)$$

In Formula (1), $w_i$ was a weight of the separator before the sonication, and was determined by measuring a weight of the separator that was not subjected to the sonication.

$w_f$ was a weight of the separator after the sonication, and was determined by measuring a weight of the separator that was subjected to the sonication.

$w_c$ was a weight of the inorganic particle layer before the sonication, and was determined by subtracting the weight of the porous substrate from the weight $w_i$ of the separator before the sonication. When the weight per unit area of the porous substrate was known, the weight of the porous substrate was obtained by multiplying an area of 100 cm² of the specimen by the weight per unit area of the porous substrate, and when the weight per unit area of the porous substrate was not known, the separator before the sonication was cut into a square with a side of 10 cm, the cut separator was immersed in a water tank at a high temperature of 80° C. or higher and then subjected to sonication and scrubbing at the same time for 5 minutes or longer to wash the separator to a level at which the water in the water tank did not become turbid, the washed separator was immersed in a treatment tank filled with an organic solvent such as acetone for 30 minutes or longer to wash the separator so as to completely release the inorganic particle layer, the porous substrate was sufficiently dried in an oven at 80° C. for 1 hour or longer, and then the weight of the dried porous substrate was measured.

The sonication was performed by immersing the separator specimen in the water tank at room temperature under conditions of a frequency of 40 kHz, an output of 1,000 W, and an application time of 60 seconds using an ultrasonic tool (sonication horn) available from Korea Ultrasound Industry.

Heat Shrinkage Rate

A heat shrinkage rate of the separator was measured based on ASTM D 1204 by the following method. Grid points were marked at intervals of 2 cm on a square with one side of 10 cm on the separator. One side of the square was in a transverse direction (TD), and the other side of the square was in a machine direction (MD). A specimen was placed in the central portion, five sheets of paper were placed on each of the top and bottom of the specimen, and four sides of the paper were wrapped with a tape. The specimen wrapped with the paper was allowed to stand in a hot air drying oven at 150° C. for 60 minutes. Thereafter, the specimen was taken out, the separator was observed with a camera, and a shrinkage rate in a length direction of the following Equation 1 and a shrinkage rate in a width direction of the following Equation 2 were calculated.

Shrinkage rate (%) in length direction=(Length in length direction before heating−Length in length direction after heating)×100/Length in length direction before heating    Equation 1

Shrinkage rate (%) in width direction=(Length in width direction before heating−Length in width direction after heating)×100/Length in width direction before heating    Equation 2

TMA Melt Fracture Temperature

Two types of specimens of the separator with a width of 5 mm and a length of 10 mm were prepared, with one specimen having a length direction in the machine direction and the other specimen having a length direction in a transverse direction. The specimens each having a thickness of 5 to 50 µm, a width of 5 mm, and a length of 10 mm in each of MD and TD serving as length directions were prepared as noted above, and each specimen is mounted on a chamber of a thermomechanical analyzer (TMA) (model: SDTA840 (Mettler Toledo)) by hooking both ends of each specimen to a metal jig and pulled downward with a force of 0.008 N while heating at 5° C. per minute, the temperature at which the specimen was broken in each of MD and TD was recorded.

Battery Resistance

A battery was manufactured under the following conditions, and a discharge resistance was measured by J-pulse method.

Manufacture of Battery 94 wt % of LiCoO₂ as a positive electrode active material, 2.5 wt % of polyvinylidene fluoride as a fusion adhesive, and 3.5 wt % of carbon black as a conductive agent were added to N-methyl-2-prrolidone (NMP) as a solvent, and stirring was performed to prepare a uniform positive electrode slurry. The prepared positive electrode slurry was coated, dried, and compressed on an aluminum foil having a thickness of 30 µm to prepare a positive electrode having a total thickness of 150 µm. 95 wt % of artificial graphite as a negative electrode active material, 3 wt % of acrylic latex having a Tg of −52° C. as a fusion adhesive, and 2 wt % of carboxymethyl cellulose (CMC) as a thickener were added to water as a solvent, and stirring was performed to prepare a uniform negative electrode slurry. The prepared negative electrode slurry was coated, dried, and compressed on an aluminum foil having a thickness of 20 µm to prepare a negative electrode having a total thickness of 150 µm. The prepared positive electrode, negative electrode, and separator were assembled into a pouch-type battery by stacking the positive electrode, negative electrode, and separator so that the separator was interposed between the positive electrode and the negative electrode, and then the assembled battery was heat-fused at 80° C. and 1 MPa with a heat press machine in order to fuse the positive electrode, the negative electrode, and the separator to each other. Thereafter, an electrolyte solution in which 1 M lithium hexafluorophosphate (LiPF₆) was dissolved was injected into a solution including ethylene carbonate (EC), ethylmethyl carbonate (EMC), and dimethyl carbonate (DMC) at a volume ratio of 30:50:20, and then the battery was sealed, thereby manufacturing a secondary battery having a capacity of 2 Ah.

EXAMPLES

Example 1

Preparation of Coating Slurry

To 100 parts by weight of distilled water, 3.2 parts by weight of (3-aminopropyl) trimethoxysilane (APTMS) was added, and lactic acid was added, and then stirring was performed for 4 hours, thereby preparing an acid aqueous solution of more than pH 4 and pH 5 or less. Boehmite (γ-AlO(OH)) (D20: 0.13 µm, D50: 0.15 µm, D80: 0.22 µm, (D80–D20)/D50:0.6) was dispersed in water, lactic acid was added, and then stirring was performed at 300 rpm for 6 hours, thereby preparing an inorganic slurry having a solid content of 37 wt % with a uniform acidity of more than pH 4 and pH 5 or less. The prepared inorganic slurry and an acid aqueous solution were stirred for 4 hours and a concentration was adjusted to prepare a coating slurry of more than pH 4 and pH 5 or less having a solid content of 24 wt % (based on the contents of APTMS and boehmite), which was adjusted so that a weight ratio of APTMS to boehmite was 10:90.

Pre-Treatment of Porous Substrate

A polyethylene porous film (porosity: 52%, Gurley permeability: 82 sec./100 cc, tensile strength MD: 2,040 kgf/cm²/TD: 1,860 kgf/cm²) having a thickness of 9 µm was used as a porous substrate, both surfaces of the polyethylene porous film were subjected to a corona discharge treatment (power density: 2 W/mm) to introduce a surface polar group, and at this time, the corona surface treatment was performed at a rate of 3 to 20 mpm (meter per minute).

Manufacture of Separator

Both surfaces of the pre-treated porous substrate were coated with the prepared coating slurry and dried to form an inorganic particle layer having an average thickness of 1.5 µm on each of the both surfaces. The porous substrate on which the inorganic particle layers were provided was subjected to aging at 100° C. for 10 hours to manufacture a separator.

Example 2

A separator was manufactured under the same conditions as in Example 1, except that acetic acid was used instead of lactic acid in the preparation of the acid aqueous solution and the inorganic slurry.

Example 3

A separator was manufactured under the same conditions as in Example 1, except that in the preparation of the inorganic slurry, an inorganic slurry was prepared by adding boehmite (D20: 0.15 µm, D50: 0.24 µm, D80: 0.4 µm, (D80–D20)/D50:0.06) at the same content instead of boehmite used in Example 1.

Example 4

A separator was manufactured under the same conditions as in Example 1, except that in the preparation of the inorganic slurry, an inorganic slurry was prepared by adding boehmite (D20: 0.21 µm, D50: 0.5 µm, D80: 1.22 µm, (D80–D20)/D50:2.02) at the same content instead of boehmite used in Example 1.

Example 5

A coating slurry of more than pH 4 and pH 5 or less having a solid content of 24 wt % (based on the contents of APTMS and boehmite) was prepared by adding (3-aminopropyl) trimethoxysilane (APTMS) and boehmite (γ-AlO(OH)) (D20: 0.13 µm, D50: 0.15 µm, D80: 0.22 µm, (D80–D20)/D50:0.6) at once to distilled water so that a weight ratio thereof was 10:90, and then adding lactic acid in the preparation of the coating slurry.

Comparative Example 1

A separator was manufactured under the same conditions as in Example 1, except that in the preparation of the coating slurry, polyvinyl alcohol (PVA, solid content: 6 wt %) having a melting temperature of 220° C. and a saponification degree of 99% and acryl latex (ZEON, BM900B, solid content: 20 wt %) having Tg of −52° C. were added at a weight ratio of 1:5 at the same content instead of APTMS.

Comparative Example 2

A separator was manufactured under the same conditions as in Example 1, except that in the preparation of the acid aqueous solution or the inorganic slurry, sulfuric acid was used as an acid component and hydrolysis and condensation were performed at pH 3.5.

Comparative Example 3

A separator was manufactured under the same conditions as in Example 1, except that in the preparation of the slurry, an acid component was not added and a slurry of pH 8.2 was prepared.

Evaluation Examples: Evaluation of Separator

The results of evaluating the physical properties of the separator of each of Examples and Comparative Examples are shown in Table 1.

TABLE 1

| | Release rate of inorganic particle layer | Heat shrinkage rate (%) | | TMA melt fracture temperature (° C.) | |
| --- | --- | --- | --- | --- | --- |
| | (%) | MD | TD | MD | TD |
| Example 1 | 95.6 | 1.7 | 1.5 | 284 | 221 |
| Example 2 | 95.8 | 1.6 | 1.4 | 212 | 197 |
| Example 3 | 96.4 | 2.8 | 2.6 | 194 | 191 |
| Example 4 | 86.2 | 2.1 | 2.3 | 201 | 213 |
| Example 5 | 84.7 | 2.1 | 1.9 | 222 | 197 |
| Comparative Example 1 | 67.2 | 50.5 | 47.4 | 159 | 150 |
| Comparative Example 2 | 63.4 | 41 | 43 | 173 | 181 |
| Comparative Example 3 | 64.8 | 44 | 38 | 181 | 179 |

Referring to Table 1, in Examples of the embodiments of the present disclosure, the release rate value of the inorganic particle layer was high, the heat shrinkage rate at a high temperature was low, and the TMA melt fracture temperature was high, and therefore, the heat resistance was significantly improved and the separator was easy to recycle because the inorganic particle layer was easily released by a simple sonication. On the other hand, in Comparative Examples not belonging to the embodiments of the present disclosure, the inorganic particle layer was not easily released, and the heat resistance was relatively deteriorated.

Meanwhile, in Example 4, both the heat resistance and the recyclability were excellent compared to those in Comparative Examples. However, in Example 4, the heat resistance was similar to the heat resistance in each of Examples 1 and 3, but the (D80–D20)/D50 value did not satisfy the particle size distribution of the inorganic particles as disclosed in the present invention, and thus, the inorganic particle layer was not released relatively well compared to those in Examples 1 to 3.

In the case of Example 5, as a result of not maintaining the pH stably by adding the inorganic particles and the silane compound to water at once and then performing stirring, both the heat resistance and recyclability were excellent compared to those in Comparative Examples, but the inorganic particle layer was not released relatively well compared to those in Examples 1 to 3.

In Comparative Example 1, polyvinyl alcohol having a hydrophilic group was used, but the inorganic particle layer was not easily released, and the heat shrinkage rate at a high temperature was high and the TMA melt fracture temperature was low, resulting in deterioration of the heat resistance.

In Comparative Examples 2 and 3, since the pH range was too low or too high, the desired low molecular weight hydrolytic condensate of a silane compound was not obtained, such that the inorganic particle layer was not easily released, the heat shrinkage rate at a high temperature was high, and the TMA melt fracture temperature was low, resulting in deterioration of the heat resistance.

As set forth above, according to various embodiments, the hydrolytic condensate of the silane compound obtained under a condition in which the silane compound is hydrolyzed and is condensation-suppressed in a weakly acidic atmosphere is used as a binder for the inorganic particle layer, such that it is possible to provide a separator that has significantly improved thermal stability and is relatively easy to recycle because the inorganic particle layer can be released by a simple sonication process. In one embodiment, the hydrolytic condensate of the silane compound is obtained through a specific pH range and a precise pH control process, and has a low molecular weight because a condensation reaction is extremely suppressed compared to a hydrolysis reaction.

In another embodiment, a release rate of the inorganic particle layer represented by the following Formula (1) may be 70% or more, 80% or more, 90% or more, 95% or more, 100% or less, and between the numerical values when measured by immersing the separator in a water tank at room temperature and then subjecting the separator to sonication under conditions of a frequency of 40 kHz, an output of 1,000 W, and an application time of 60 seconds:

$$(w_i - w_f)/w_c * 100 \qquad (1)$$

wherein
$w_i$ is a weight of the separator before the sonication,
$w_f$ is a weight of the separator after the sonication, and
$w_c$ is a weight of the inorganic particle layer before the sonication.

Specifically, the release rate of the inorganic particle layer is influenced in a complex way by the thickness of the inorganic particle layer, the particle diameter of the inorganic particle, the porosity and thickness of the porous substrate, the type, molecular weight, and ratio of the binder used in the inorganic particle layer, and the like. In particular, when the inorganic particle layer is ultra-finely processed by vibration and rotation of water molecules by sonication, a degree of release of the inorganic particle layer in the water tank is influenced by the type and molecular weight of the binder that connects and fixes the inorganic particle layer.

Accordingly, in one embodiment of the present disclosure, it is possible to provide, as a binder, a hydrolytic condensate of a silane compound that has a low molecular weight and a relatively high fraction of the polar group because a condensation reaction is suppressed through a specific pH range and precise pH control process, and as a result, significantly improved high heat resistance may be secured, and at the same time, the inorganic particle layer is can be released by a simple process, which may impart a significantly improved recycling effect.

In one embodiment, it is possible to provide a separator having heat resistance so that when specimens each having a thickness of 5 to 50 μm, a width of 5 mm, and a length of 10 mm in each of MD and TD serving as length directions are prepared from the separator, and each specimen is mounted on a chamber of a thermomechanical analyzer (TMA) (model: SDTA840 (Mettler Toledo)) by hooking both ends of the specimen to a metal jig and pulled downward with a force of 0.008 N while heating at 5° C. per minute, at least one of the specimens is broken in both MD and TD at a temperature of 180° C. or higher, 190° C. or higher, 200° C. or higher, or 210° C. or higher.

In another embodiment, a heat shrinkage rate in each of MD and TD may be 3% or less when measured after the separator is allowed to stand at 150° C. for 60 minutes.

In another embodiment, a method of providing the physical properties described above is not particularly limited. However, the method of imparting the above physical properties may be achieved by manufacturing a separator having an inorganic particle layer in which pores are formed by connecting inorganic particles to each other by condensing a silane compound represented by the following Chemical Formula 1 under a condition in which the silane compound is hydrolyzed and is condensation-suppressed and applying a coating slurry obtained by mixing the hydrolytic condensate of the silane compound with inorganic particles on at least one surface of a porous substrate formed of polyethylene or the like.

$$A_a Si(OR)_b \qquad \text{Chemical Formula 1}$$

In Chemical Formula 1, A is hydrogen, a polar functional group, or a C1-C10 alkyl group having a polar functional group, R is independent of hydrogen or a C1-C5 alkyl group, a is 0 to 2, b is 2 to 4, and a+b is 4.

In another embodiment, examples of the method of providing a separator having the above physical properties include: stirring an acid aqueous solution whose pH is adjusted in advance and an inorganic slurry to prepare a coating slurry; and coating and drying, on at least one surface of the porous substrate, the coating slurry maintained and controlled so that the silane compound of Chemical Formula 1 is condensed under a condition in which the silane compound is hydrolyzed and is condensation-suppressed. Accordingly, a separator satisfying the above physical properties may be manufactured.

Further, according to another embodiment of the present invention, an electrochemical device including the separator obtained by any one of the exemplary embodiments may be provided.

In one embodiment, when the inorganic particles having a specific particle size distribution and the hydrolytic condensate of the silane compound produced under a condition in which condensation of the silane compound is suppressed are applied together to the inorganic particle layer, the inorganic particle layer is uniformly filled with the inorganic particles by the hydrolytic condensate of the silane compound, such that the release rate of the inorganic particle layer may be significantly improved during subsequent sonication. As an exemplary embodiment, in the particle size distribution of the inorganic particles, a (D80–D20)/D50 value may be 0.01 or more, 0.03 or more, 0.05 or more, 0.1 or more, 0.2 or more, 2.0 or less, 1.8 or less, 1.5 or less, 1.3 or less, 1.2 or less, or any value between the numerical values. As a non-limiting example, the (D80–D20)/D50 value may be 0.01 to 2.0, 0.01 to 1.8, and 0.01 to 1.5. When the inorganic particles satisfy the particle size distribution within the above range, the inorganic particles are connected (e.g., evenly connected) and fixed to the hydrolytic condensate of the silane compound produced under a condition in which condensation of the silane compound is suppressed, and the inorganic particle layer is filled (e.g., uniformly filled) with the inorganic particles, such that the release rate of the inorganic particle layer is further improved during the sonication.

In another embodiment, the surface of the porous substrate is modified to include a polar functional group such as a carboxyl group, an aldehyde group, or a hydroxyl group by a surface treatment including one or more of a corona discharge treatment and a plasma discharge treatment. Therefore, a polar functional group of the hydrolytic condensate of the silane compound that connects and fixes the inorganic particle layer may be hydrogen-bonded or chemically bonded to the polar functional group on the surface of the surface-treated porous substrate, and as a result, without using the organic polymer binder as used in the past, the adhesive strength between the porous substrate and the inorganic particle layer may be significantly excellent, and the heat resistance may be significantly improved because the heat shrinkage rate may be significantly reduced even at a high temperature.

In one embodiment, the inorganic particle layer is formed, and then the aging process is performed, such that the adhesive strength between the porous substrate and the inorganic particle layer may be increased, and the heat shrinkage rate at a high temperature may be reduced.

Hereinabove, although the present disclosure has been described by specific matters, limited embodiments, and drawings, they have been provided only for understanding of the present disclosure. Therefore, the present disclosure is not limited to the disclosed embodiments. Various modifications and changes may be made by those skilled in the art to which the present disclosure pertains from this description.

Therefore, the scope of the present disclosure should not be limited to the described embodiments, but all modifications equal or equivalent fall within the scope of the present disclosure.

What is claimed is:

1. A separator comprising:
a porous substrate; and
an inorganic particle layer formed on at least one surface of the porous substrate and including inorganic particles and a hydrolytic condensate of a silane compound,
wherein a release rate of the inorganic particle layer represented by the following Formula (1) is 70% or more when measured by immersing the separator in a water tank at room temperature and then subjecting the separator to sonication under conditions of a frequency of 40 kHz, an output of 1,000 W, and an application time of 60 seconds:

$$(w_i - w_f)/w_c * 100 \quad (1)$$

wherein
$w_i$ is a weight of the separator before the sonication,
$w_f$ is a weight of the separator after the sonication, and
$w_c$ is a weight of the inorganic particle layer before the sonication.

2. The separator of claim 1, wherein the release rate of the inorganic particle layer is 80% or more.

3. The separator of claim 1, wherein the inorganic particle layer has a (D80–D20)/D50 value of 0.01 to 2.0 in a particle size distribution of inorganic particles.

4. The separator of claim 1, wherein when specimens each having a thickness of 5 to 50 μm, a width of 5 mm, and a length of 10 mm in each of a machine direction (MD) and a transverse direction (TD) serving as length directions are prepared from the separator, and each specimen is mounted on a chamber of a thermomechanical analyzer (TMA) by hooking both ends of each specimen to a metal jig and pulled downward with a force of 0.008 N while heating at 5° C. per minute, the specimens have a heat resistance in which the specimens are broken at a temperature of 180° C. or higher.

5. The separator of claim 1, wherein a heat shrinkage rate in each of MD and TD is 3% or less when measured after the separator is allowed to stand at 150° C. for 60 minutes.

6. The separator of claim 1,
wherein the hydrolytic condensate of the silane compound is a hydrolytic condensate produced under a condition in which the silane compound is hydrolyzed and is condensation-suppressed in a weakly acidic atmosphere.

7. The separator of claim 6, wherein the silane compound is a compound represented by the following Chemical Formula 1:

$A_aSi(OR)_b$ <span style="float:right">Chemical Formula 1</span> wherein A is hydrogen, a polar functional group, or a C1-C10 alkyl group having a polar functional group, R is independent of hydrogen or a C1-C5 alkyl group, a is 0 to 2, b is 2 to 4, and a+b is 4, and
wherein the polar functional group includes one or two or more of an amino group, an epoxy group, a carboxyl group, a hydroxyl group, an amide group, a thiol group, a ketone group, an ester group, and an aldehyde group.

8. The separator of claim 1, wherein the porous substrate has a surface including a polar functional group.

9. An electrochemical device comprising the separator of claim 1.

* * * * *